3,360,513
CERTAIN ESTERS OF AZEPINE CARBOXYLIC
ACIDS AND THEIR PREPARATION
Robert J. Cotter, Bernardsville, N.J., assignor to Union
Carbide Corporation, a corporation of New York
No Drawing. Filed June 5, 1963, Ser. No. 285,595
11 Claims. (Cl. 260—239)

The present invention relates to azepine derivatives and methods for producing them. More particularly the present invention relates to N-azepinyl carboxylates and their preparation.

The N-azepinyl carboxylates are all quite biologically active particularly as fungicides and more particularly against fungi species such as sclerotium rolfsii.

According to the present invention, a new and unusual reaction phenomena has been discovered in which an aromatic cyclic moiety of the benzene series is enlarged to create a seven-membered heterocyclic ring containing nitrogen according to the following scheme shown in simplified version for purposes of illustration only:

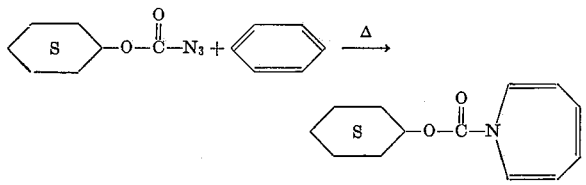

These products are novel azepine derivatives and are represented by the formula:

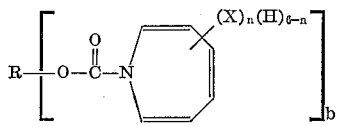

wherein R is an inert hydrocarbon moiety having a valence equal to $b$, and free of substituents reactive under the conditions of the reaction; X is a ring substituent inert to the conditions of the reaction, $n$ is a digit having a value of from 0 to 6 inclusive, and $b$ is an integer having a value of from 1 to 3 inclusive. By the term "inert hydrocarbon moiety having a valence equal to $b$, and free of substituents reactive under the conditions of the reaction" is meant those monovalent, divalent and trivalent groups having a basic hydrocarbon group bonded through a carbon atom to the ether oxygen atom of a formyl group, such as basic alkyl, alkanediyl, alkanetriyl, cycloalkyl, cycloalkanediyl, cycloalkanetriyl, alkaryl, aryl, and aralkyl, arylene, aromatic triyls and such hydrocarbon moieties which may or may not be substituted with inert groups either hydrocarbon or non-hydrocarbon groups as long as the substituent group is inert and non-reactive under the conditions of the reaction.

Illustrative of said basic hydrocarbon moieties as represented by R are methyl, ethyl, propyl, butyl, pentyl, hexyl, octyl, decyl, cosyl, methylene, ethylene, propylene, trimethylene, pentanediyl, heptanediyl, decanediyl, pentadecanetriyl, cosanetriyl, cyclopropyl, cyclobutyl, cyclopentyl, cyclohexl, cycloheptyl, cyclopentanediyl, cyclohexanediyl, cyclohexanetriyl, phenyl, tolyl, benzyl, phenethyl, phenenyl, methoxymethyl, ethoxypropyl, hexoxymethyl, chlorohexyl, iodoethyl, bromononyl, fluorodecyl, methylthiobutyl, ethylthiohexyl, methoxycyclopentyl, cyclohexoxycyclohexyl, chlorophenyl, dichlorophenyl, fluorobenzyl, dibromophenylene, methoxyphenyl, phenylpropylphenyl, phenoxyphenyl, chlorophenoxyphenyl and the like.

It should be noted that the basic hydrocarbon moiety as represented by R does not enter into the reaction but serves merely as an appendage, thus its particular structure is not critical in this invention as long as it is free of substituent groups which are reactive under the conditions of the reaction.

In like manner the azepine moiety can have inert substituents as represented by X which can be either hydrocarbon or non-hydrocarbon groups, attached in any one or in fact all six carbon positions of the azepine nucleus. Illustrative of the inert substituents, as represented by X, which can be present on the azepine nucleus or on the hydrocarbon moiety as represented by R are halogen substituents such as fluorine, chlorine, bromine and iodine, alkyl groups of from 1 to 12 carbon atoms such as methyl, ethyl, propyl, butyl, pentyl, hexyl, decyl, dodecyl and the like; aryl substituents such as tolyl, benzyl and the like; alkoxy substituents such as methoxy, ethoxy, propoxy, butoxy, and the like; aryloxy substituents such as phenoxy and the like; alkylthio substituents such as methylthio, ethylthio, propylthio, hexylthio and the like; and arylthio substituents such as phenylthio, benzylthio and the like.

Reactive substituents which cannot be present and which X cannot represent are those substituents which contain an "active" hydrogen. The reason for this is that such substituents react with the reactants or interfere with the reaction in the preparation of these azepine derivatives. Illustrative of said reactive substituents are amino, carboxy, and sulfonic acid substituents.

The compounds of the present invention are produced through the reaction of an azidoformate of the formula:

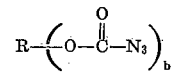

wherein $b$ and R have been previously defined, with an aromatic hydrocarbon of from 6 to 30 carbon atoms inclusive which contains at least one benzenoid nucleus in its structure. This reaction can be illustrated by the following reaction diagram:

Reaction I

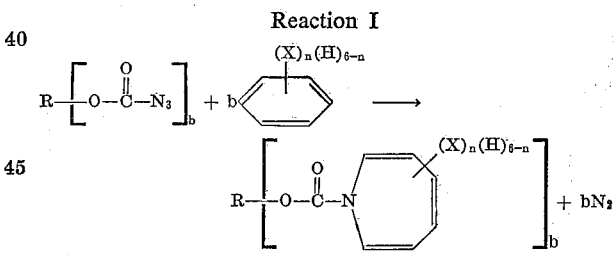

wherein R, $b$, X and $n$ have been previously defined.

The azidoformates which are used in the production of the compounds of the present invention and which are represented above can be prepared by reacting the desired haloformate with an alkali metal azide. This reaction can be represented by

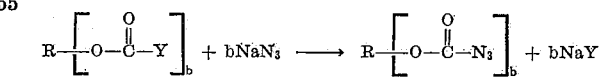

wherein R and $b$ have been previously defined and Y is a halogen group such as fluoro, chloro, bromo or iodo.

In the preparation of azidoformates as illustrated above, the reactants can be used in about stoichiometric amounts based on the number of haloformate groups. It is preferred however, to use an alkali metal azide in an amount of from about .9 to about 1.5 mole equivalents per mole of haloformate reacted, based upon the number of haloformate groups. For example, if the haloformate reacted is phenyl haloformate then from about .9 to about 1.5 moles of alkali metal azide would be reacted per mole of phenyl haloformate; but if the haloformate reacted were the bis(haloformate) of hydroquinone then from about 1.8 to about 3 moles of alkali metal azide would be reacted per mole of the bis(haloformate) of hydroquinone.

If, of course, an alkaline earth metal azide were used only one half of the above amounts would have to be used as there would be two azido groups available per molecule of metallic azide. As as been stated however, the alkali metal azides are preferred. This preference is dictated by the fact that the alkali metal azides are more easily prepared, are commercially available and can be handled with a minimum of safety precautions.

The preparation of the azidoformates as illustrated above is generally conducted at a temperature of from about 0° to about 125° C. It is preferred, however, to conduct the reaction at a temperature of from about 25° C. to about 75° C. as the likelihood of decomposition is less.

This reaction can be conducted if desired in the presence of non-aqueous diluents. Such a diluent should be inert to both the reactants and the products. Such diluents should also be "dry" or substantially anhydrous as water reacts with the haloformates reactant in a competing side reaction. It is preferable to select a diluent which is a solvent for both the reactants although this is not necessary. The diluent should, however, be a solvent for the haloformate reactant. Suitable diluents include: diethyl ether, acetone, benzene, toluene, methyl ethyl ketone, tetrahydrofuran, dioxane, durene, acetonitrile, dimethylacetamide, and dimethyl sulfone.

While it is preferred to conduct this reaction at atmospheric pressure, it can be conducted at sub-atmospheric, or superatmospheric pressure, provided, of course, the appropriate pressure equipment is used.

The azidoformate product

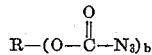

as defined above is recovered from the reaction mixture by suitable conventional means. If the product azidoformate is a liquid, it is preferred to recover it as a residue by distilling off the diluent after removal of the halide salt; if the product azidoformate is a solid it is preferred to recover it by crystallization.

Illustrative of the azidoformates which can be used in the preparation of the azepine derivatives are the alkyl azidoformates such as methyl azidoformate, ethyl azidoformate, butyl azidoformate, heptyl azidoformate, methoxyethyl azidoformate, ethylene di(azidoformate), hexanetriyl triazidoformate, chloropropyl azidoformate, bromomethyl azidoformate, methylthioethyl azidoformate, azidopentyl azidoformate and the like; the cycloalkyl azidoformates such as cyclopentyl azidoformate, cyclohexyl azidoformate, cyclohexanediyl di(azidoformate), the aryl azidoformates, such as phenyl azidoformate, chlorophenyl azidoformate, tolyl azidoformate, dimethylphenyl azidoformate, ethylphenyl azidoformate, phenylene di(azidoformate), and the like and the aralkyl azidoformates, such as benzyl azidoformate, phenethyl azidoformate, phenylpropyl azidoformate and the like.

The aromatic hydrocarbon reactant as illustrated above, must contain at least one benzenoid nucleus in its structure. It should be noted that the aromatic hydrocarbon reactant can be correspondingly substituted by any group X which is inert under the reaction conditions as are set forth above for the azepine moiety.

Illustrative of the aromatic hydrocarbon reactants are benzene, chlorobenzene, dichlorobenzene, toluene, propylbenzene, methylthiobenzene, cholorotoluene, methoxybenzene, diphenyl, diphenylmethane, 1,2-diphenylethane, 2,2 - diphenylpropane, 1,3-diphenylpropane, terphenyl, benzyl chloride, and the like.

Fused polynuclear hydrocarbons containing at least one benzenoid nucleus such as naphthalene, tetrahydronaphthalene, anthracene, phenanthrene, acenaphthalene, binaphthalene, indane, fluorene, tetracene, chrysene and the like may also be used as aromatic hydrocarbon reactants.

In addition, steroidal compounds, wherein a benzenoid ring is present may also be reactants. The products from such a reaction are related to the biologically active azasteroids. The reaction rates of the fused polynuclear hydrocarbons are generally low, and longer reaction times are therefore generally required for these compounds.

The reactants can be used in stoichiometric amounts. However, in cases where the aromatic compound is inexpensive and easily recoverable, it has been found desirable to utilize an excess of aromatic hydrocarbon reactant. In such cases, the mole ratio of azidoformate to aromatic hydrocarbon can range up to 500, especially in larger scale operations. A preferred range for the mole ratio of azidoformate to aromatic hydrocarbon is 10 to 150 as highly satisfactory yields are obtainable under these conditions.

If the aromatic hydrocarbon reactant contains at least two benzenoid systems, then the use of stoichiometric amounts or excess of azidoformate favors reaction of both of the benzenoid systems. The following reaction illustrates this reaction course.

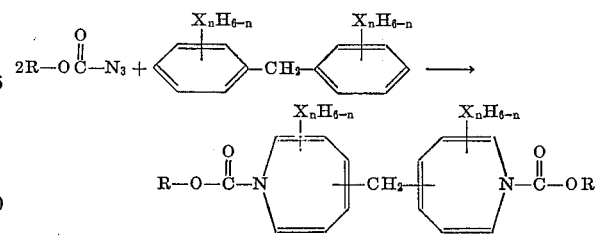

The reaction is conducted at a temperature of from about 50° C. to about 300° C. and preferably of from about 100° C. to about 150° C. The preferred temperature range produces fewer side reactions and results in high product yields.

It should be noted that the reaction temperature can be lowered considerably without adversely affecting the reaction, through the use of an azide decomposition aid, such as ultraviolet radiation, particle irradiation ($\alpha,\beta,\eta$), X-ray irradiation, catalysts which catalyze the controlled decomposition of azides at lower temperatures and/or combinations of these expedients. When such expedients are used, reaction temperatures of from about −50° C. to about +50° C. can be used. When lower temperatures are used in the absence of azide decomposition aids, the reaction rates are of course slower and can require up to 200 hours or more to complete the reaction.

This reaction is generally conducted at a pressure of from 15 pounds per square inch to 750 pounds per square inch, however autogeneous pressure is preferred.

Diluents, other than an excess of aromatic reactant, can be used in the reactions of the present invention provided they do not react with the reactants or the products or otherwise interfere with the reaction. Illustrative of suitable diluents are halogenated hydrocarbons such as carbon tetrachloride, perfluorocyclohexane, tetrachloroethane, fluorotrichloromethane, difluorodichloromethane.

The diluents, if used, should be essentially anhydrous.

If the azepine product is a liquid, it can be recovered by decantation or distillation from the reaction mixture. Alternatively if it is a solid, it can be recovered from the reaction mixture by filtration and purified by recrystallization from suitable solvents. These derivatives are also conveniently purified by chromatographic separation as illustrated by the examples below.

As has been stated the compounds of the present invention exhibit marked biological activity and have been demonstrated to be effective as fungicides. Those compounds which have exhibited higher biological activity are those compounds wherein R is a cyclic hydrocarbon radical, such as aryl and cycloalkyl.

These compounds can also be used as emission liquids in "laser" (light amplification by stimulated emission of radiation) apparatus utilizing liquids as emission media, and functioning as liquid media for stimulated "Raman" scattering.

When the compounds of the present invention are to be utilized as pesticides they can be dispersed in any suitable solvent or emulsified in any liquid and applied by any of the conventional means known to the art.

To facilitate the distribution of the pesticidal compounds disclosed herein, they are preferably applied in conjunction with a non-aqueous diluent or extender. The extender can be either a liquid such as the liquid hydrocarbons, ketones, ethers and the like or a powdered solid. For application as dusting compositions the compounds may be so admixed with finely divided solid inert materials as to provide homogeneous free-flowing dusts. The usual pulverized inert materials may be used, preferably talcs, natural clays, pyrophyllite, diatomaceous earth or cotton seed flour or other flours. Other inert solid carriers may be magnesium or calcium carbonate, calcium phosphate, etc., either in powder or granular form. The percent by weight of the essential active ingredient will vary according to the manner in which the composition is to be applied but, in general, will be from about 0.5 to 95 percent by weight of dust. The preferred percentage range of the active essential ingredient is from about 2 to about 15 percent by weight based upon the total weight of the dusting composition. The inert carriers may be substituted in whole or in part by other materials which it is desired to apply to the soil, for instance, fertilizers, soil conditions, and the like.

Liquid pesticidal compositions are preferably applied with kerosene as the extender, the amount of kerosene depending principally upon the convenience of the agriculturist and the type of spraying apparatus which he customarily uses. Sprays which are toxic to fungi can contain from 0.1 to 95 percent by weight of the active essential ingredient based upon the total weight of the spray and preferably contain from 2 to 15 percent by weight of the active essential ingredient based upon the total weight of the spray. Illustrative of suitable liquid vehicles are kerosene, petroleum ether, naphtha, ligroin, petroleum oils, vegetable oils, methyl ethyl ketone, acetone, methyl isobutyl ketone, dioxane, ethyl ether and the like.

In the case of liquid sprays it is desired to have the pesticidal compound in homogeneous dispersion and for this purpose a surface-active agent is preferably used. Substantially any wetting, dispersing or penetrating agent may be used whether anionic, cationic or non-ionic. The preferred concentrates contain the pesticidal compound with from about 0.1 percent to 15 percent by weight of surface-active agent with a sufficient amount of the fungicidal compound to make 100 parts by weight, such compositions then being suitable for admixture with either a solid or a fluid extender. For general use, the weight of surface-active agent will be from 5 percent to 10 percent of the weight of the active ingredient in the concentrate. Suitable surface-active, wetting or dispersing agents may be, for example, sodium and potassium oleates, the amine salts of oleic acid such as morpholine and dimethylamine oleates, the sulfonated animal and vegetable oils such as sulfonated fish oil and castor oil, sulfonated petroleum oils, sulfonated acyclic hydrocarbons, sodium salt of lignin sulfonic acid, alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glyceral monostearate, diglycol oleate, polyethylene oxides, ethylene oxide condensation products, with stearyl alcohol and octylphenol, polyvinyl alcohols, salts such as the acetate of polyamines from reductive amination of ethylene carbon monoxide polymers, laurylamine hydrochloride, laurylpyridinium bromide stearyltrimethylammonium bromide, cetyldimethylbenzyl ammonium chloride, lauryldimethylamine oxide, and the like.

The compounds contemplated herein may be used with or without "addends," such as those addends which cause the fungicides to adhere evenly and strongly to plant foliage, such as methyl cellulose, extending materials or diluents, such as the inert materials previously mentioned, which facilitate the measuring of and the application of the small amounts of active materials which are necessary to inhibit the pests.

For purposes of illustration and comparison the following compounds were evaluated as fungicides as follows:

Compound I.—N-carbophenoxy azepine

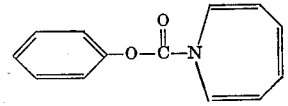

Compound II.—N-carboethoxy azepine

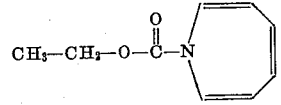

Compounds I and II were evaluated as soil fungicides.

*Soil fungicide test.*—The test compounds were evaluated against each of the following test organisms:

*Pythium splendens*
*Rhizoctonia solani*
*Fusarium gladiola*

Soil having the following composition:
   Degerminated corn meal—600 cubic centimeters
   Washed white sand—700 cubic centimeters
   Distilled water—500 milliliters was prepared by mixing the above ingredients and sterilizing the mixture in an autoclave for 30 minutes at 15 pounds per square inch. The solidfied mixture was allowed to cool and was then sliced into 0.75 inch cubes. These cubes were then thoroughly mixed with approximately one pound of sterile soil. This soil mixture was then placed in sterile paper cups.

The soil was inoculated 24 hours prior to testing with cultures one week old.

The toxicant solution is equivalent in concentration to an application 38 pounds per acre. Thirty milliliters of the toxicant solution is drenched into the infected soil in each of the cups. The treated cups were then incubated for a period of two days at a temperature of 70° C. and a relative humidity of 100 percent.

The compounds were visually rated against each organism according to the following designations:

| Rating: | Basis |
|---|---|
| 5 | No growth. |
| 4 | One or two colonies. |
| 3 | Surface ½ covered with colonies. |
| 2 | Surface ¾ covered with colonies. |
| 1 | Growth equal to controls. |

Results of the soil fungicide test—

Compound I:
   *Sclerotium rolfsii* _____ 5
   *Pythium splendens* _____ 5
   *Rhizoctonia solani* _____ 5
   *Fusarium gladiola* _____ 5
Compound II:
   *Rythium splenden* _____ 3
   *Rhizoctonia solani* _____ 3
   *Fusarium gladiola* _____ 3

Illustration I.—Preparation of phenyl azidoformate

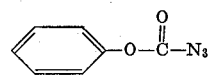

To a solution of 15.66 grams (0.1 mole) of phenyl-chloroformate in 100 milliliters of dry acetone (dried over anhydrous magnesium sulfate) were added 6.83 grams (0.105 mole) of sodium azide. The resulting mixture was charged to a reflux apparatus and held under reflux for a period of two hours, during which period the mixture was agitated by means of a magnetic stirrer. Upon completion of the reflux period, the reacted mixture was cooled and filtered to remove insoluble salts. Acetone was then removed from the filtrate by distillation under reduced pressure. The liquid residue was then further distilled to yield a fraction boiling at a temperature of from 46° C. to 50° C. at a pressure of 0.05 millimeter of mercury. A yield of 14.41 grams was recovered which amounted to an 88.5 percent yield based upon the phenyl chloroformate used in the reaction.

Illustration II.—Preparation of ethyl azidoformate

To a 100-milliliter flask were charged 10.90 grams of redistilled ethyl chloroformate and 7.16 grams of sodium azide in 40 milliliters of water. The resulting mixture was stirred at room temperature for a period of two hours and then transferred to a separatory funnel. The bottom layer was drawn off the dried over sodium sulfate. The ethyl azidoformate was decanted from the sodium sulfate and weighed 8.76 grams, a yield of 76 percent. It was shown to be pure by infra-red spectral analysis.

EXAMPLE 1

A solution made from 15.40 grams of phenyl azido-formate in two liters of sodium-dried benzene was heated in a stirred autoclave at 125° C. for two hours, under autogeneous pressure. The cooled reaction solution was filtered and concentrated to a volume of 150 milliliters by vacuum distillation. This solution was put on a column of 200 grams of a magnesia-silica adsorbent packed in benzene and eluted with 750 milliliters of diethyl ether. The eluent solution was stripped of solvent under reduced pressure to yield a residue of 13.5 grams. The product was dissolved in 100 milliliters of benzene and chromatographed on 300 grams of silica gel (mesh 28–200) packed in benzene. Elution was continued with benzene until no residue was obtained in the eluent solution (about 1.5 liters). Elution was continued with benzene:ether (9:1 by volume) until 1200 milliliters of the eluent were collected. Removal of the solvent by vacuum distillation yielded 9.51 grams of an orange oil that crystallized. This product was dissolved in 200 milliliters of ethyl ether and the ether solution washed with 50 milliliter portions of 1 percent sodium hydroxide solution (10 times), and 3 times with 50 milliliter portions of water. The ethereal solution was dried over anhydrous sodium sulfate and the ether removed by vacuum distillation to yield 8.30 grams of an orange oil, which solidified on cooling. This product's infra-red spectrum was essentially identical to a purified sample of N-carbophenoxyazepine. Pure N-carbophenoxyazepine was obtained from the above product by a sublimation at 0.1 millimeter of mercury at 70–100° C., rechromatographing the sublimed yellow solid (melting point 62–5° C.) on silica gel as described above, and resublimation of the product from the chromatogram. Pure N-carbophenoxyazepine is a yellow solid, melting point 66–7° C.

Elemental analysis:

| | Carbon | Hydrogen | Nitrogen |
| --- | --- | --- | --- |
| Calculated | 73.22 | 5.20 | 6.57 |
| Found | 73.28 | 5.24 | 6.29 |

The infrared spectrum of this product possessed carbonyl adsorption at 5.80μ and characteristic azepine double bond adsorptions at 6.05μ and 6.15μ. The ultraviolet spectrum and nuclear magnetic resonance spectrum confirmed the assigned structure.

In a similar manner N-carbochlorophenoxy azepine, N-carbochlorophenoxy dichloroazepine, 1,4-bis(N-azepinylcarboxy)benzene and 1,2-bis(N-azepinylcarboxy)ethane are prepared by substituting the corresponding reactants as shown below:

| Product | Azidoformate | Aromatic Hydrocarbon |
| --- | --- | --- |
| N-carbochlorophenoxy azepine. | p-Chlorophenyl azidoformate. | Benzene. |
| N-carbochlorophenoxy dichloroazepine. | p-Chlorophenyl azidoformate. | Dichlorobenzene. |
| 1,2-bis(N-azepinylcarboxy)ethane. | 1,2-bis(azidoformate) ethane. | Benzene. |
| 1,4-bis(N-azepinylcarboxy)benzene. | 1,4-bis(azidoformate) benzene. | Do. |

EXAMPLE 2

Preparation of N-carboethoxy azepine

A solution of 8.76 grams of ethyl azidoformate in 800 milliliters of sodium dried benzene was charged to an autoclave. The autoclave was sealed and the solution was heated to a temperature of 125° C. which temperature was maintained for a period of two hours. At the end of this reaction period the autoclave was vented and the reaction mixture was recovered. Unreacted benzene was removed from the reaction mixture by distillation under vacuum, leaving a residue of 11.1 grams. This residue was redissolved in 50 milliliters of dry benzene and chromatographed on a column (5.9 cm.×12.1) of 200 grams of 28–200 mesh silica gel packed in benzene. The initial elution of the column with 600 milliliters of benzene removed 1.39 grams of a black resin. Continued elution of the column with one liter of a 1:1 mixture of benzene:diethyl ether removed 5.20 grams of a red-orange oil which was essentially pure N-carboethoxyazepine. The reaction yield, based on the azidoformate, was 41.3 percent.

The product, N-carboethoxyazepine, was further distilled at a temperature 75–80° C. and a pressure 0.1 millimeters of mercury to yield a red-orange liquid having a refractive index of $n_D^{20}$ 1.5284. The structure of the product was confirmed by elemental analysis, and infra-red, ultraviolet, and nuclear magnetic spectra.

In a similar manner N-carbochloroethoxy azepine, N-carbomethoxyethoxy azepine and N-carbocyclohexoxy azepine are prepared by utilizing reactants corresponding to the product desired as indicated below:

| Product | Azidoformate | Aromatic Hydrocarbon |
| --- | --- | --- |
| N-carbochloroethoxy azepine. | Chloroethyl azidoformate. | Benzene. |
| N-carbomethoxyethoxy azepine. | Methoxyethyl azidoformate. | Do. |
| N-carbocyclohexoxy azepine. | Cyclohexyl azidoformate. | Do. |

EXAMPLE 3

Preparation of N-carbophenoxy methylazepine

A solution of 10 grams of phenyl azidoformate and 90 grams of reagent toluene was held under reflux for a period of 3 hours. Nitrogen was evolved over this heating period. The toluene was removed from the solution by distillation under reduced pressure to yield 10.0 grams of a dark residue. The residue was redissolved in 300 milliliters of ethyl ether and filtered. The filtrate was then washed successively with three 50-milliliter portions of 10 percent sodium hydroxide solution; three 50-milliliter portions of 5 percent hydrochloric acid, and two 50-milliliter portions of distilled water. The washed filtrate was then dried over anhydrous sodium sulfate. After removal of the drying agent and the ethyl ether by distillation, there was obtained an orange residue of 9.41 grams. Distillation of this residue yielded an orange distillate of 4.68 grams having a boiling point of 140° C. at 0.6 millimeter of mercury. The infra-red spectra of this distillate possessed the characteristic azepine double bond adsorptions at $6.05\mu$ and $6.15\mu$. It was also analyzed satisfactorily for the N-carbophenoxymethylazepine structure.

Elemental analysis showed the following:
Percentage carbon—Calculated, 74.00; found, 73.83.
Percentage hydrogen—Calculated, 5.53; found, 5.67.
Percentage nitrogen—Calculated, 6.17; found, 6.36.

EXAMPLE 4

*Preparation of N-carboethoxy chloroazepine*

In a manner similar to Example 2, N-carboethoxy chloroazepine was prepared by reacting 4.81 grams of ethyl azidoformate with 150 milliliters of chlorobenzene at a temperature of 125° C. for a period of 2 hours under autogeneous pressure. The product was recovered by distillation of the excess chlorobenzene at reduced pressure and the residue purified by chromatography on a $5.9 \times 11.2$ column of silica gel packed in benzene, as described in Example 2. 1.84 grams of N-carboethoxy chloroazepine were recovered. The infrared spectrum of the purified product possessed the characteristic azepine double bond absorptions at $6.05\mu$ and $6.15\mu$.

EXAMPLE 5

*Preparation of N-carboethoxy phenylazepine*

In a manner similar to Example 4 above, N-carboethoxy phenylazepine was prepared by reacting 8.2 grams of ethyl azidoformate with 75 grams of biphenyl at a temperature of 125° C. for a period of 2 hours under autogeneous pressure. The product was recovered and purified by the chromatographic technique as described in Example 2 above. 7.31 grams of N-carboethoxy phenylazepine were recovered. The infrared spectrum of the purified product possessed the characteristic absorptions at $6.06\mu$, $6.20\mu$, $7.60\mu$, and $9.0\mu$. Absorption due to the nonsubstituted phenyl group occurred at $13.2\mu$ and $14.4\mu$.

EXAMPLE 6

*Preparation of N-carbopentoxy azepine*

In a manner similar to Example 2 above, N-carbopentoxy azepine was prepared by reacting 7.86 grams of pentyl azidoformate with 700 grams of benzene at a temperature of 125° C. for a period of 2 hours under autogeneous pressure. The product was recovered by vacuum distillation of the excess benzene and the crude residue purified by chromatography on a silica gel (mesh 28–200) column. The same solvent system as used in Example 2 was also employed in this case. 6.32 grams of N-carbopentoxy azepine were recovered giving a 60 percent yield. The infra-red spectrum of the purified product possessed the characteristic azepine double bond absorption at $6.05\mu$ and $6.15\mu$.

What is claimed is:

1. A compound of the formula:

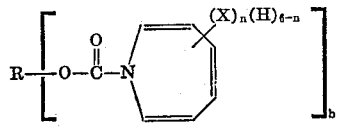

wherein R is a cyclic hydrocarbon radical of from 6 to 30 carbon atoms inclusive; X represents a member selected from the group consisting of halogen, alkyl of 1 to 12 carbon atoms, phenyl, tolyl, benzyl, lower alkoxy and lower alkylthio, $n$ is a digit having a value of 0 to 3 and $b$ is an integer having the value of 1 to 3.

2. A compound as defined in claim 1 wherein R is an alicyclic hydrocarbon radical, $n$ is 0 and $b$ is 1.
3. A compound as defined in claim 1 wherein R is an aromatic hydrocarbon radical, $n$ is 0 and $b$ is 1.
4. N-carbophenoxy azepine.
5. N-carbophenoxy methylazepine.
6. N-carboethoxy chloroazepine.
7. N-carboethoxy phenylazepine.
8. N-carbopentoxy azepine.
9. The method of producing N-azepinyl carboxylates by thermolysis which comprises reacting an azidoformate of the formula:

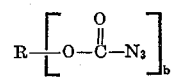

wherein R has a valence equal to $b$ and represents a member selected from the group consisting of alkyl, alkanediyl, alkanetriyl, cycloalkyl, cycloalkanediyl, cycloalkanetriyl, alkaryl, aryl, aralkyl, arylene and aromatic hydrocarbon triyls of from 1 to 30 carbon atoms, inclusive; and $b$ is an integer having a value of from 1 to 3 inclusive with an aromatic hydrocarbon containing at least one benzenoid nucleus of from 6 to 30 carbon atoms inclusive at a temperature of from 50° C. to 300° C.

10. The method of claim 9 wherein said aromatic hydrocarbon is benzene.

11. The process for the preparation of azepine compounds of the formula

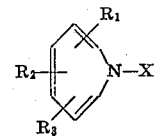

wherein X is carbo-lower alkoxy and $R_1$, $R_2$ and $R_3$ represent members selected from the group consisting of hydrogen, lower alkyl, lower alkoxy, and halogen, comprising subjecting a member selected from the group consisting of benzene, lower alkylbenzene, lower alkoxybenzene, and halobenzene to the action of an azido formic acid lower alkyl ester at an elevated temperature.

References Cited

UNITED STATES PATENTS

| | | | |
|---|---|---|---|
| 2,187,719 | 3/1941 | Williams | 260—239 |
| 2,683,145 | 7/1954 | Lyle et al. | 260—239 |
| 2,861,917 | 11/1958 | Kosmin | 167—33 |
| 2,941,994 | 6/1960 | Silberman | 260—239 |
| 3,105,005 | 9/1963 | Cannon et al. | 167—33 |

OTHER REFERENCES

Hafner et al.: Angewandte Chemie, vol. 74, p. 365 (1962).

Hafner et al.: Angewandte Chemie, vol. 75, pp. 89–90 (1963).

Hafner et al.: Angewandte Chemie, International Edition in English, vol. 2, p. 96 (1963).

Lwowski et al., J. Am. Chem. Soc., vol. 85, pp. 1200–1202 (1963).

ALTON D. ROLLINS, *Primary Examiner.*

N. S. RIZZO, ALEX MAZEL, *Examiners.*